(12) United States Patent
Chen et al.

(10) Patent No.: US 10,401,970 B1
(45) Date of Patent: Sep. 3, 2019

(54) KEYBOARD DEVICE AND MANUFACTURING METHOD THEREOF

(71) Applicant: Primax Electronics Ltd., Taipei (TW)

(72) Inventors: Bo-An Chen, Taipei (TW); Chien-Hung Liu, Taipei (TW); Ming-Han Wu, Taipei (TW); Yi-Wei Chen, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 16/044,756

(22) Filed: Jul. 25, 2018

(30) Foreign Application Priority Data

Mar. 30, 2018 (TW) .............................. 107111334 A

(51) Int. Cl.
| | |
|---|---|
| *G06F 3/02* | (2006.01) |
| *H01H 13/705* | (2006.01) |
| *H01H 3/12* | (2006.01) |
| *H01H 13/704* | (2006.01) |

(52) U.S. Cl.
CPC ........... *G06F 3/0202* (2013.01); *H01H 3/125* (2013.01); *H01H 13/704* (2013.01); *H01H 13/705* (2013.01)

(58) Field of Classification Search
CPC .. G06F 3/0202; H01H 13/705; H01H 13/704; H01H 3/125
See application file for complete search history.

(56) References Cited

U.S. PATENT DOCUMENTS

| | | | | |
|---|---|---|---|---|
| 9,697,965 | B2* | 7/2017 | Chen | H01H 13/705 |
| 2010/0259423 | A1* | 10/2010 | Randall | H01H 13/70 341/24 |
| 2013/0220786 | A1* | 8/2013 | Niu | H01H 3/125 200/344 |
| 2015/0101916 | A1* | 4/2015 | Chen | H01H 3/125 200/5 A |
| 2015/0338883 | A1* | 11/2015 | Farahani | G06F 1/1656 361/679.1 |
| 2018/0025859 | A1* | 1/2018 | Chen | H01H 13/14 200/5 A |
| 2018/0025862 | A1* | 1/2018 | Chen | G06F 1/16 200/5 A |
| 2018/0040438 | A1* | 2/2018 | Chen | H01H 13/14 |
| 2018/0166232 | A1* | 6/2018 | Pan | H01H 13/7065 |
| 2018/0197698 | A1* | 7/2018 | Chung | H01H 13/705 |

* cited by examiner

*Primary Examiner* — Abhishek Sarma

(74) *Attorney, Agent, or Firm* — Kirton McConkie; Evan R. Witt

(57) ABSTRACT

A keyboard device and a manufacturing method of the keyboard device are provided. The keyboard device includes a base plate, a membrane circuit board and a key. A connecting structure with an upper connecting part is protruded from the base plate. The membrane circuit board includes a first film layer with an extension part. A clearance space is formed between the extension part and the base plate. An end part of the stabilizer bar of the keycap is clamped between the upper connecting part and the extension part. While the stabilizer bar is moved, the end part of the stabilizer bar is slid between the upper connecting part and the extension part. Moreover, the end part of the stabilizer bar and the extension part are interfered with each other and sunken downwardly into the clearance space.

15 Claims, 12 Drawing Sheets

KEYBOARD DEVICE AND MANUFACTURING METHOD THEREOF

FIELD OF THE INVENTION

The present invention relates to an input device, and more particularly to a keyboard device.

BACKGROUND OF THE INVENTION

Generally, the widely-used peripheral input device of a computer system includes for example a mouse device, a keyboard device, a trackball device, or the like. Via the keyboard device, characters or symbols can be inputted into the computer system directly. As a consequence, most users and most manufacturers of input devices pay much attention to the development of keyboard devices.

The structures and the functions of a conventional keyboard device 1 will be illustrated as follows. Please refer to FIGS. 1, 2 and 3. FIG. 1 is a schematic top view illustrating the outer appearance of a conventional keyboard device. FIG. 2 is a schematic exploded view illustrating a portion of the keyboard device of FIG. 1. FIG. 3 is a schematic cross-sectional view illustrating the assembled structure of the keyboard device of FIG. 2. For example, the keyboard device as shown in FIGS. 1, 2 and 3 is disclosed in Taiwanese Patent No. TWI512774.

The conventional keyboard device 1 comprises plural keys 10', a base plate 11 and a membrane circuit board 12. The membrane circuit board 12 comprises plural membrane switches (not shown) corresponding to the plural keys 10'. Each of the plural keys 10' comprises a keycap 101, at least one scissors-type connecting element 102 and at least one elastic element 103. The scissors-type connecting element 102 is connected between the keycap 101 and the base plate 11. Moreover, the scissors-type connecting element 102 comprises a first frame 1021 and a second frame 1022. The second frame 1022 is pivotally coupled to the first frame 1021. Consequently, the first frame 1021 and the second frame 1022 can be swung relative to each other. The elastic element 103 is arranged between the keycap 101 and the base plate 11. Moreover, the elastic element 103 comprises a contacting part (not shown).

While the keycap 101 of any key 10' is depressed and moved downwardly relative to the base plate 11, the first frame 1021 and the second frame 1022 of the scissors-type connecting element 102 are switched from an open-scissors state to a stacked state. Moreover, as the keycap 101 is moved downwardly to compress the elastic element 103, the corresponding membrane switch is pushed and triggered by the contacting part of the elastic element 103. Consequently, the keyboard device 1 generates a corresponding key signal. When the key 10' is no longer depressed, the keycap 101 is moved upwardly relative to the base plate 11 in response to an elastic force of the elastic element 103. Meanwhile, the first frame 1021 and the second frame 1022 are switched from the stacked state to the open-scissors state again, and the keycap 101 is returned to its original position.

The key 10' further comprises two stabilizer bars 104. Each stabilizer bar 104 comprises a transverse bar part 1041 and two hook parts 1042. The two hook parts 1042 are located at two ends of the transverse bar part 1041, respectively.

The base plate 11 comprises a plate body 112 and plural connecting structures 111. The plate body 112 is located under the membrane circuit board 12. The plural connecting structures 111 are protruded upwardly from the plate body 112 and penetrated through the membrane circuit board 12. Each connecting structure 111 comprises an upper connecting part 1112 and plural lateral connecting parts 1113. The plural lateral connecting parts 1113 are connected with the upper connecting part 1112. Moreover, plural locking holes 1111 are formed between the connecting part 1112, the plural lateral connecting parts 1113 and the plate body 112. The transverse bar part 1041 of the each stabilizer bar 104 is pivotally coupled to the keycap 101 of the key 10'. The two hook parts 1042 of each stabilizer bar 104 are penetrated through the locking holes 1111 of the corresponding connecting structure 111.

Please refer to FIG. 3 again. While the keycap 101 of the key 10' is moved upwardly or downwardly relative to the base plate 11, the stabilizer bars 104 are moved in the direction D11, the direction D12, the direction D13 or the direction D14, and rotated in the direction D15 or the direction D16. By this design, the key 10' is kept stable and not inclined while the key 10' is moved upwardly or downwardly relative to the base plate 11. Moreover, this design is helpful to increase the strength of the keycap 101.

Please refer to FIGS. 2 and 3 again. The plate body 112 of the base plate 11 comprises plural accommodation spaces 114, which are in slot forms. The positions of the accommodation spaces 114 are determined according to movable ranges of the hook parts 1042 of the corresponding stabilizer bars 104. That is, the positions of the accommodation spaces 114 are substantially located under the movable ranges of the hook parts 1042. The membrane circuit board 12 comprises an extension part 125. The accommodation spaces 114 are covered by the extension part 125. While each stabilizer bar 104 is moved with the keycap 101, only the hook parts 1042 of the stabilizer bar 104 are contacted with the extension part 125 of the membrane circuit board 12. In addition, the hook parts 1042 and the extension part 125 are sunken downwardly into the accommodation spaces 114 of the plate body 112. That is, while the stabilizer bar 104 is moved, the stabilizer bar 104 is not directly contacted with the plate body 112 of the base plate 11. Since the stabilizer bar 104 does not directly collide with the plate body 112 of the base plate 11, the sound resulted from the collision will be reduced. In such way, the efficacy of reducing the noise is achieved.

As mentioned above, the plate body 112 of the base plate 11 comprises the slot-form accommodation spaces 114 for reducing the noise, and the extension part 125 of the membrane circuit board 12 is used to cover the accommodation spaces 114 and support the hook parts 1042 of the stabilizer bar 104. However, since the extension part 125 of the membrane circuit board 12 is made of a soft material and there is no supporting structure under the extension part 125, the action of the stabilizer bar 104 is not stable. In other words, the function of stabilizing the key 10' by the stabilizer bar 104 is largely reduced.

Recently, the trend of designing the keyboard device 1 is toward miniaturization. Consequently, the diameter of the stabilizer bar 104 is gradually reduced. After the hook part 1042 of the stabilizer bar 104 is penetrated through the corresponding locking hole 1111 of the connecting structure 111, the vacant spaces between the hook part 1042 and the upper connecting part 1112 and the plural lateral connecting parts 1113 of the connecting structure 111 become larger. Consequently, while the stabilizer bar 104 is moved with the keycap 101, the hook part 1042 of the stabilizer bar 104 readily collides with the upper connecting part 1112 and the plural lateral connecting parts 1113 to generate a sound. Especially, the sound-reducing design of the conventional keyboard device 1 results in another drawback. After the hook part 1042 is sunken downwardly into the corresponding accommodation space 114 and the hook part 1042 is moved upwardly in response to an elastic force of the extension part 125, the hook part 1042 strongly collides with the upper connecting part 1112 of the connecting structure 111 because of the elastic force. Consequently, the intensity of the sound becomes louder. Generally, the sound from collision is unpleasant noise to the user.

In other words, the conventional keyboard device 1 needs to be further improved.

SUMMARY OF THE INVENTION

An object of the present invention provides a keyboard device having a function of reducing noise. An end part of a stabilizer bar is clamped between an upper connecting part of a connecting structure of a base plate and an extension part of a first film layer of a membrane circuit board. While the stabilizer bar is moved, the end part of the stabilizer bar is slid between the upper connecting part and the extension part. Moreover, the end part of the stabilizer bar and the extension part are interfered with each other, and the end part of the stabilizer bar and the extension part are sunken downwardly into a clearance space between the extension part and the base plate.

In accordance with an aspect of the present invention, there is provided a keyboard device. The keyboard device includes a membrane circuit board, a base plate and a key. The membrane circuit board includes a membrane switch, a first film layer and a second film layer. The first film layer and the second film layer are stacked on each other. The first film layer includes an extension part. The extension part is extended over a periphery of the second film layer. The base plate includes a plate body and a connecting structure. The plate body is located under the membrane circuit board. The connecting structure is protruded upwardly from the plate body and penetrated through the membrane circuit board. The connecting structure includes an upper connecting part and a lateral connecting part. The lateral connecting part is connected with the upper connecting part. A locking hole is formed between the connecting part, the lateral connecting part and the plate body. The plate body is located under the extension part. A clearance space is formed between the extension part and the plate body. The key includes a keycap and a stabilizer bar. While the keycap is moved downwardly relative to the membrane circuit board, the membrane switch is triggered. The stabilizer bar is connected between the keycap and the base plate. An end part of the stabilizer bar is penetrated through the locking hole and clamped between the upper connecting part and the extension part. While the keycap is moved upwardly or downwardly relative to the base plate, the end part of the stabilizer bar is slid between the upper connecting part and the extension part, the end part of the stabilizer bar and the extension part are interfered with each other, and the end part of the stabilizer bar and the extension part are sunken downwardly into the clearance space.

In accordance with another aspect of the present invention, there is provided a manufacturing method for manufacturing the keyboard device of the present invention. Firstly, in a step (P1), a diameter of the stabilizer bar and/or a first vertical distance between a bottom surface of the upper connecting part and the extension part is changed. Consequently, an extent of the interference between the end part of the stabilizer bar and the extension part is adjusted.

In a step (P2), an extensible range of the extension part is determined according to a movable range of the end part of the stabilizer bar.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
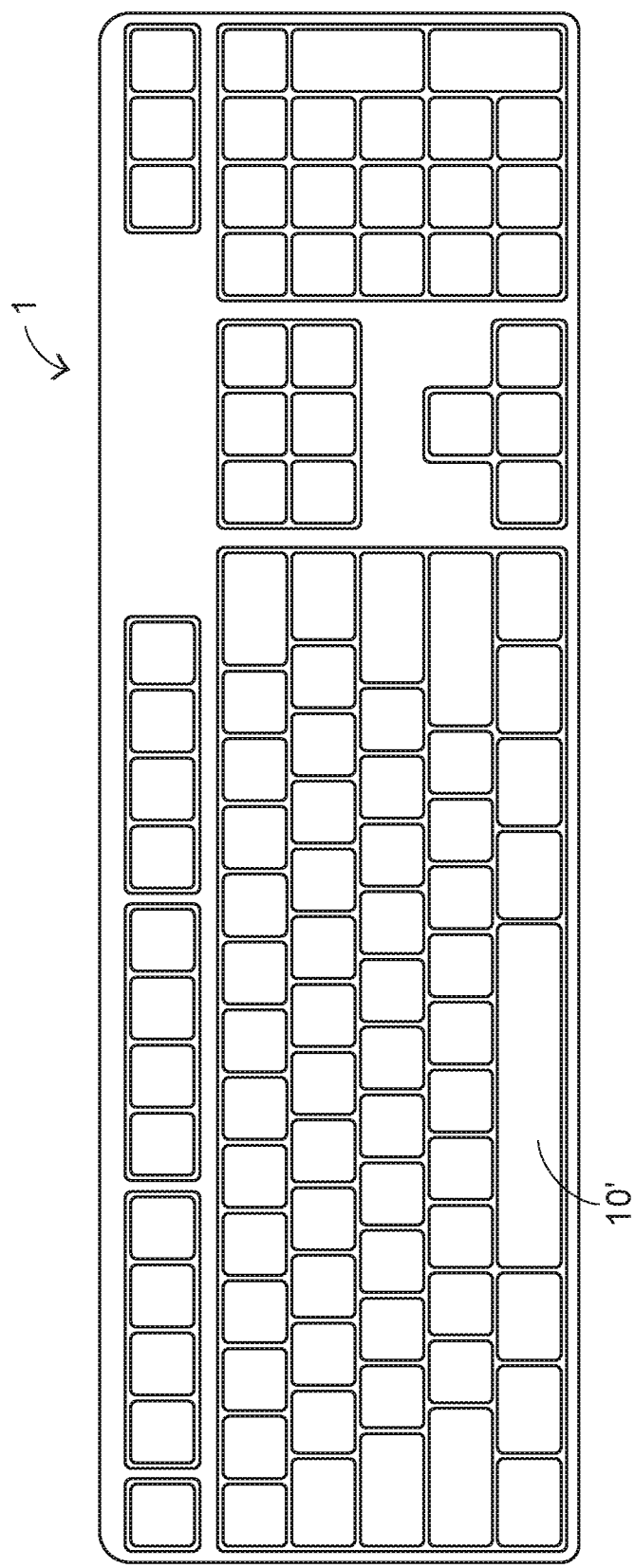
FIG. 1 is a schematic top view illustrating the outer appearance of a conventional keyboard device.
Figure 2:
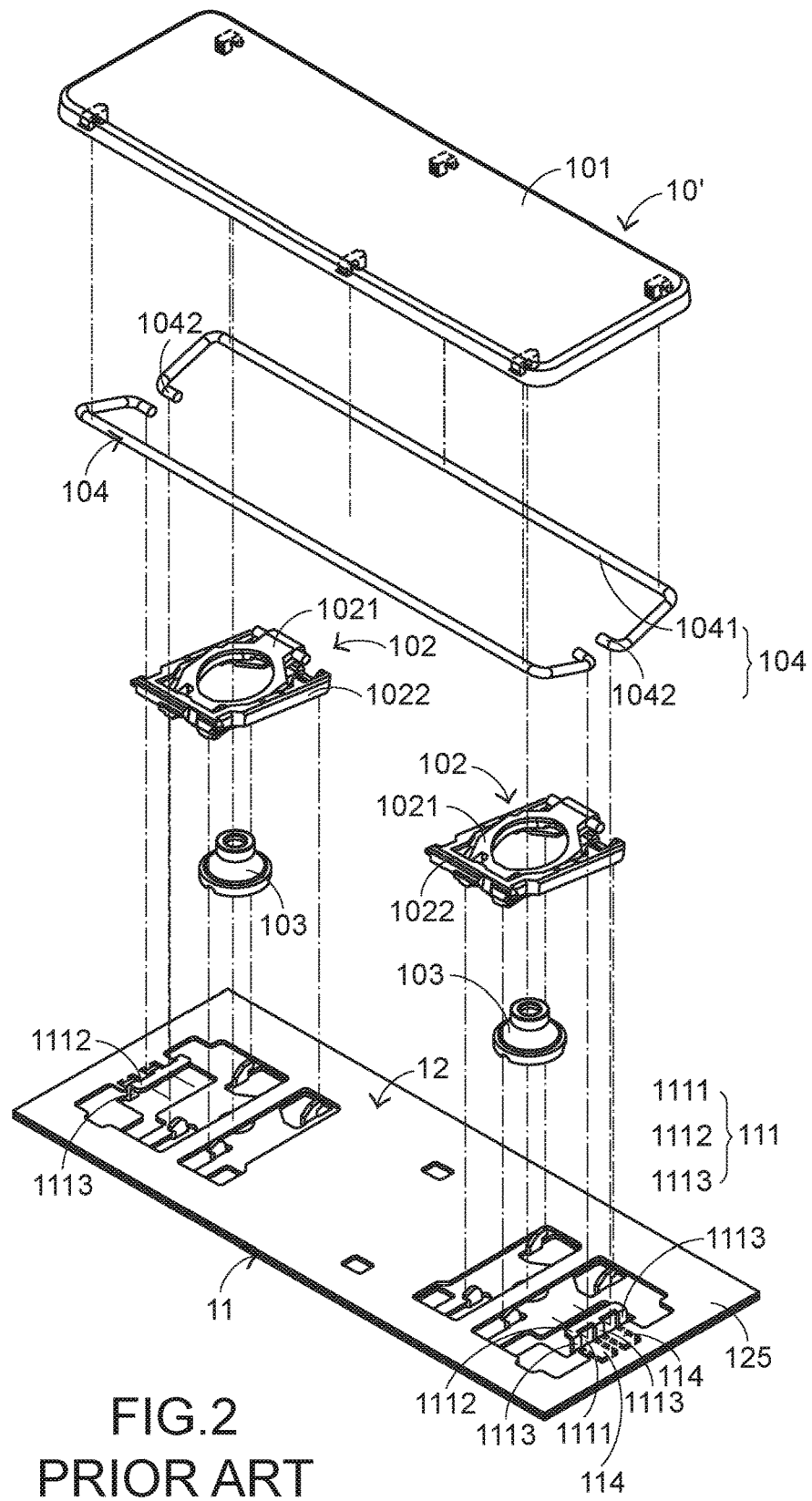
FIG. 2 is a schematic exploded view illustrating a portion of the keyboard device of FIG. 1.
Figure 3:
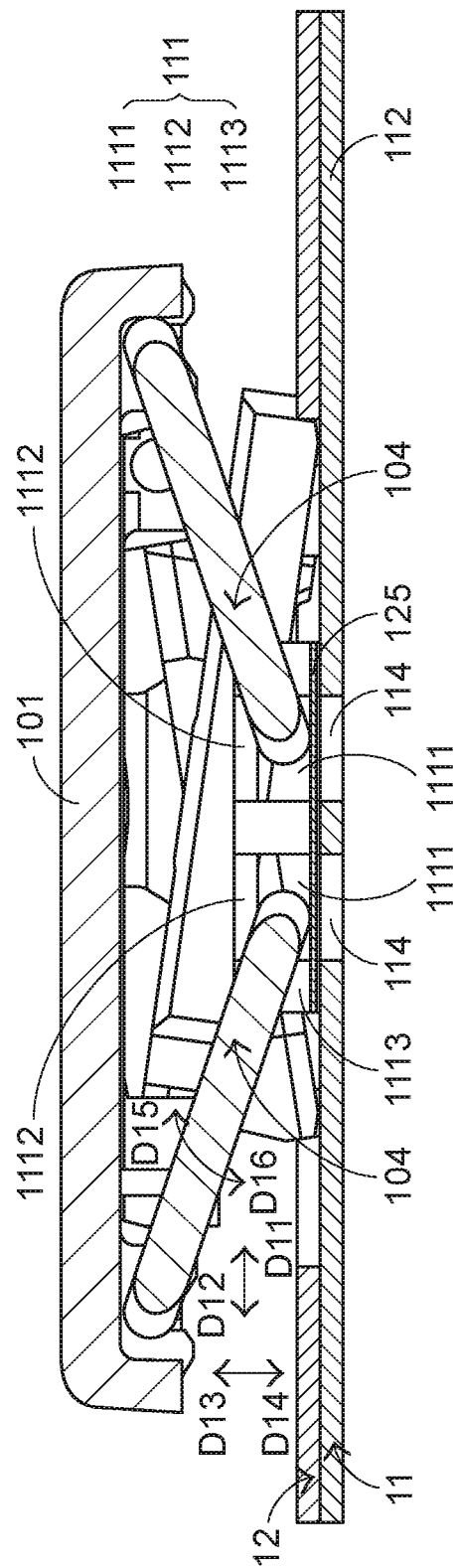
FIG. 3 is a schematic cross-sectional view illustrating the assembled structure of the keyboard device of FIG. 2.
Figure 4:
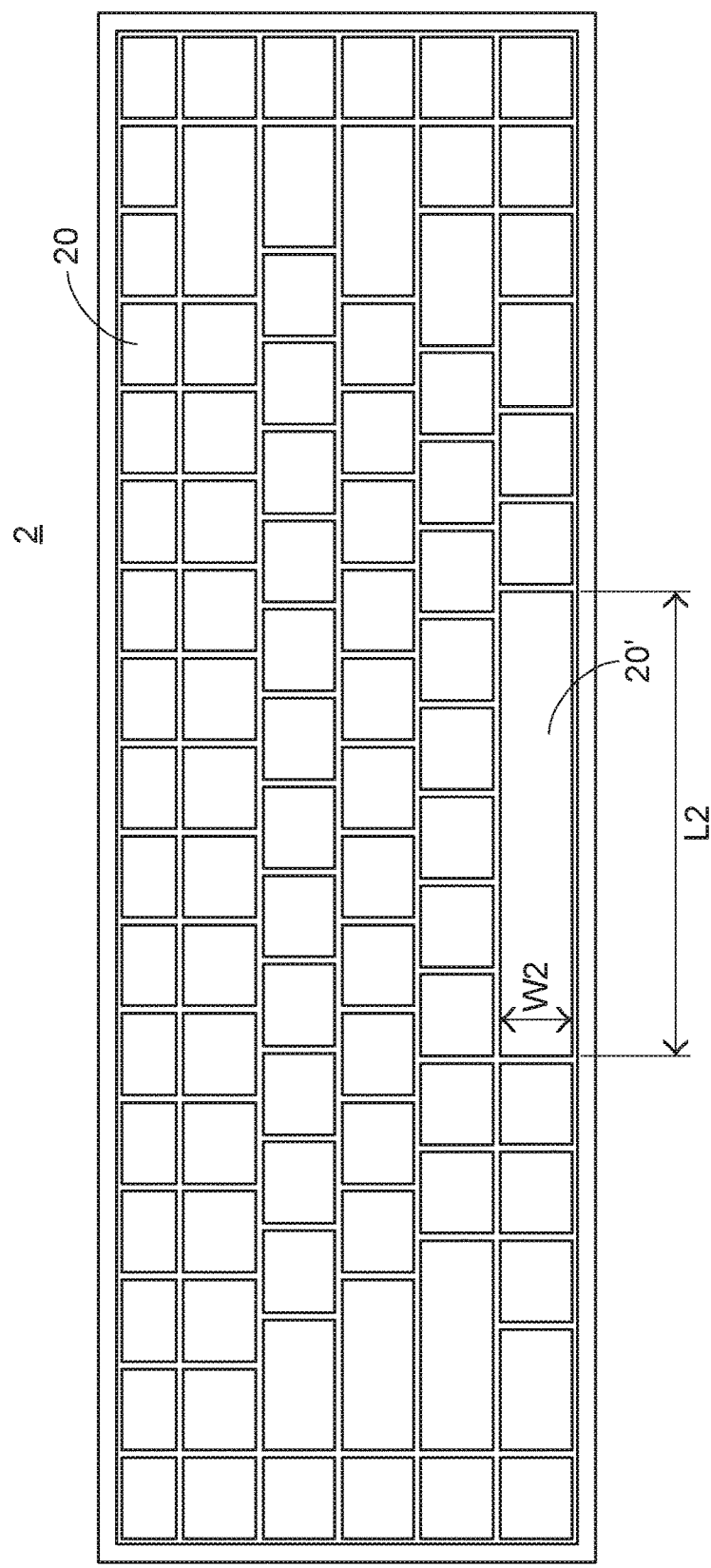
FIG. 4 is a schematic top view illustrating the outer appearance of a keyboard device according to a first embodiment of the present invention.
Figure 5:
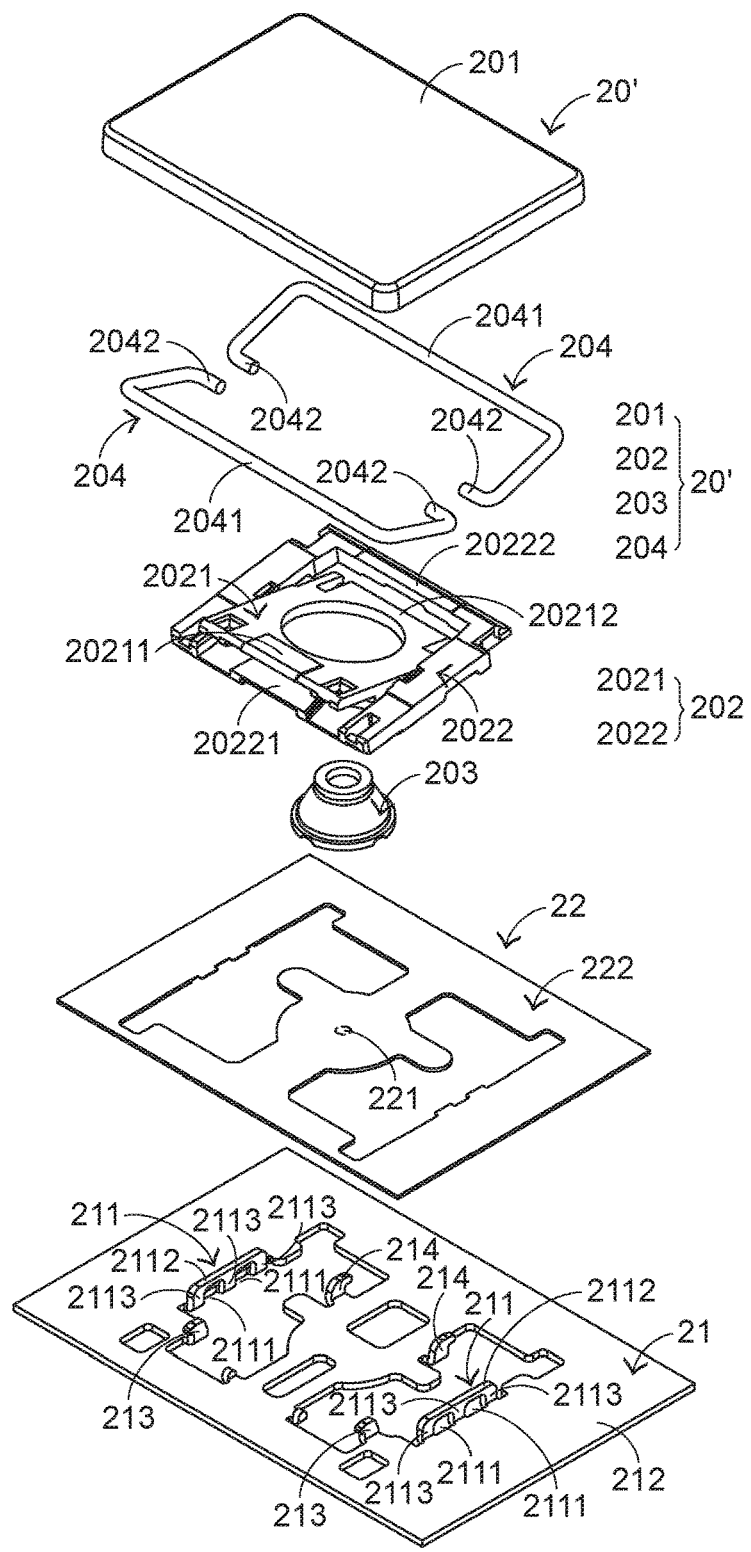
FIG. 5 is a schematic exploded view illustrating a portion of the keyboard device of FIG. 4 and taken along a viewpoint.
Figure 6:
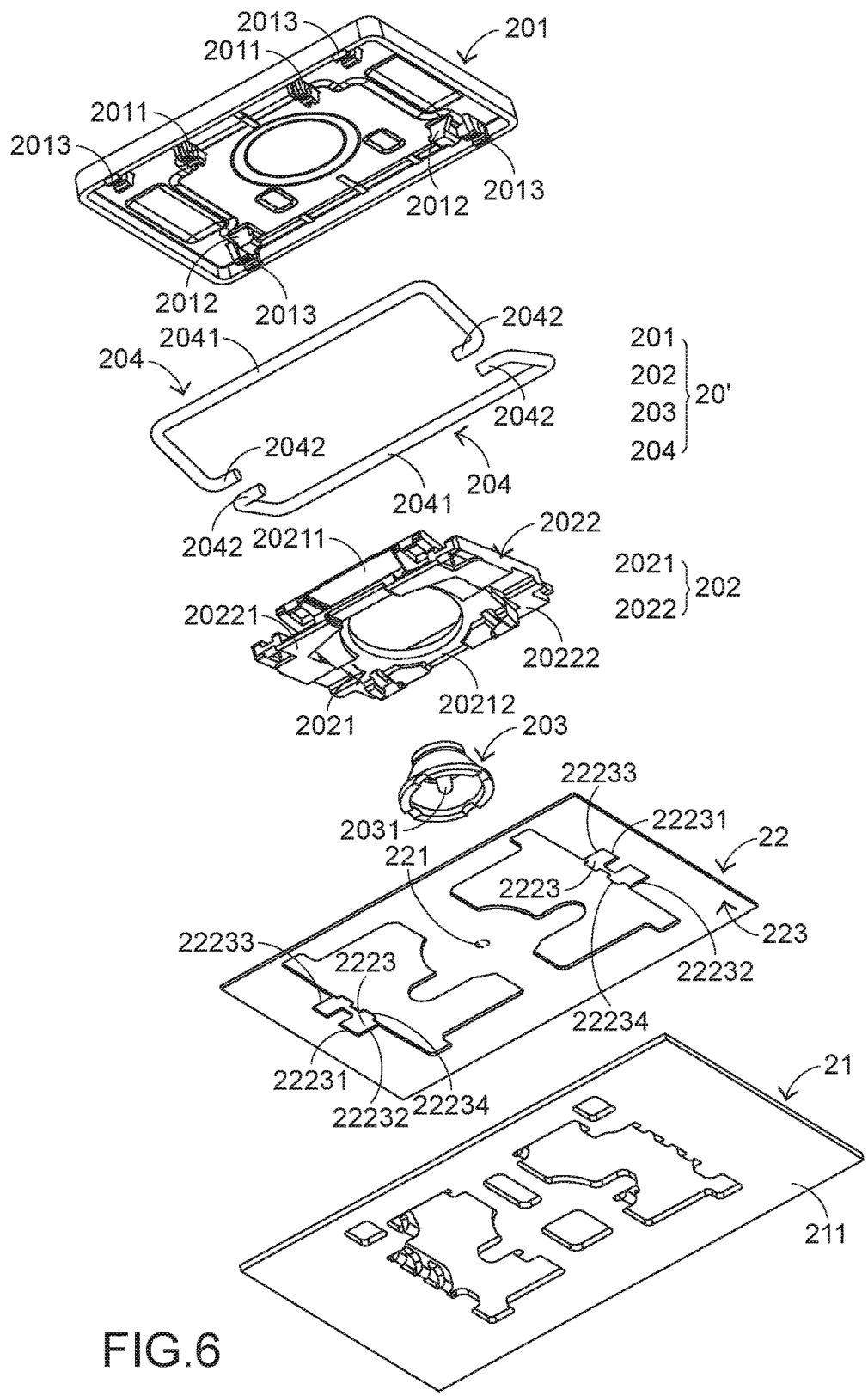
FIG. 6 is a schematic exploded view illustrating a portion of the keyboard device of FIG. 4 and taken along another viewpoint.

Please refer to FIGS. 4, 5 and 6. FIG. 4 is a schematic top view illustrating the outer appearance of a keyboard device according to a first embodiment of the present invention. FIG. 5 is a schematic exploded view illustrating a portion of the keyboard device of FIG. 4 and taken along a viewpoint. FIG. 6 is a schematic exploded view illustrating a portion of the keyboard device of FIG. 4 and taken along another viewpoint. For succinctness, only one key 20' and the related components are shown in FIGS. 5 and 6.

The keyboard device 2 comprises plural keys 20 and 20', a base plate 21 and a membrane circuit board 22. These keys 20 and 20' are classified into some types, e.g., ordinary keys, numeric keys and function keys. When one of the keys 20 and 20' is depressed by the user's finger, the keyboard device 2 generates a corresponding key signal to a computer (not shown), and thus the computer executes a function corresponding to the depressed key. For example, when an ordinary key is depressed, a corresponding English letter or symbol is inputted into the computer. When a numeric key is depressed, a corresponding number is inputted into the computer. In addition, the function keys (F1~F12) can be programmed to provide various quick access functions.

Figure 7:
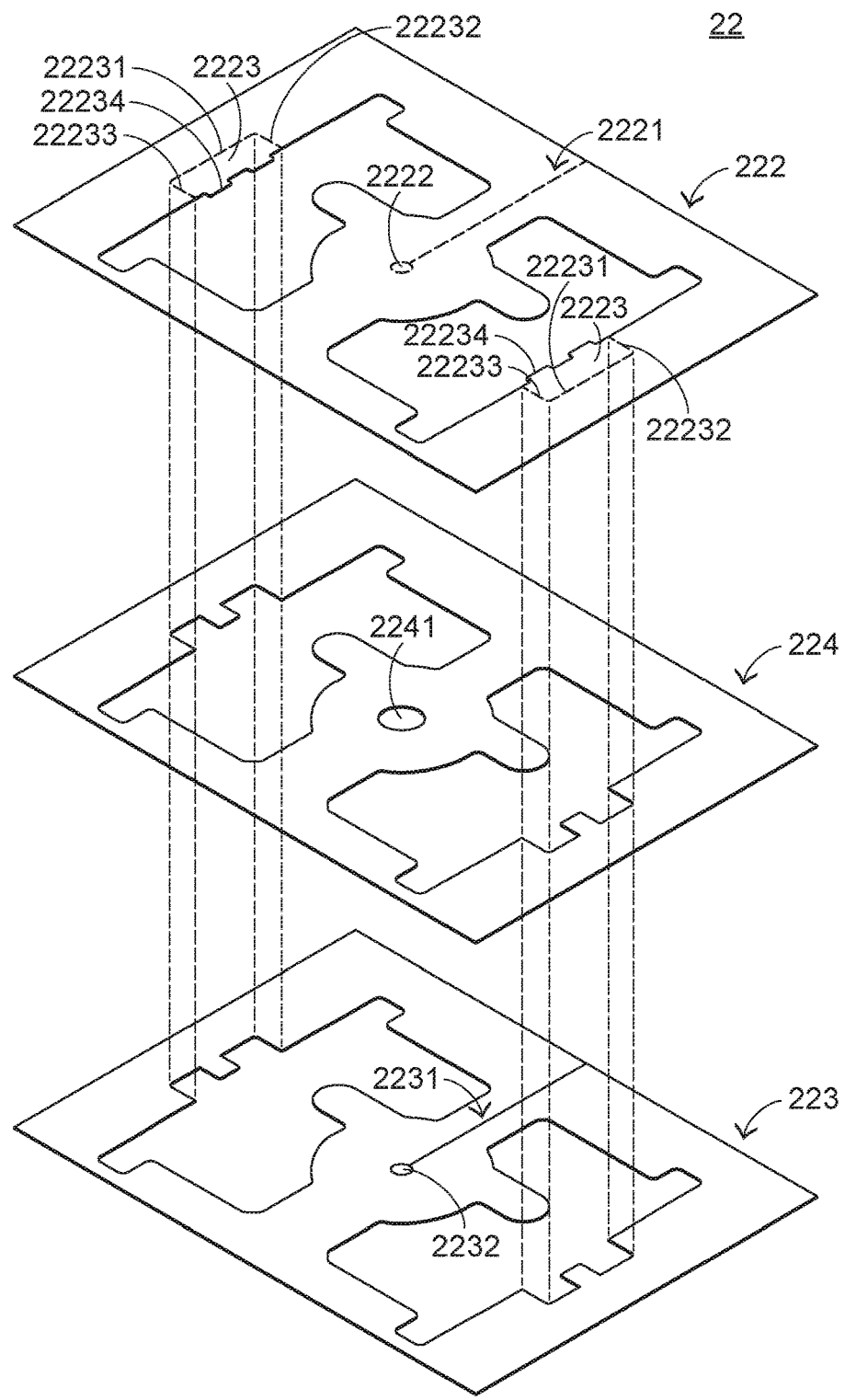
FIG. 7 is a schematic exploded view illustrating the membrane circuit board of the keyboard device as shown in FIG. 4.

FIG. 7 is a schematic exploded view illustrating the membrane circuit board of the keyboard device as shown in FIG. 4. The membrane circuit board 22 comprises plural layers. The thickness of each film layer is presented herein for purpose of illustration and description only. For succinctness, only one upper contact, one lower contact and one perforation are shown in FIG. 7. As shown in FIG. 7, the membrane circuit board 22 comprises a first film layer, a second film layer and a third film layer, which are stacked on each other. In an embodiment, an upper film layer 222, a lower film layer 223 and an intermediate film layer 224 are the first film layer, the second film layer and the third film layer, respectively. A first circuit pattern 2221 is formed on a bottom surface of the upper film layer 222. The first circuit pattern 2221 comprises plural upper contacts 2222 corresponding to the plural keys 20 and 20'. A second circuit pattern 2231 is formed on a top surface of the lower film layer 223. The second circuit pattern 2231 comprises plural lower contacts 2232 corresponding to the plural upper contacts 2222. Each of the upper contacts 2222 and the corresponding lower contact 2232 are separated from each other by a spacing distance. Moreover, each of the upper contacts 2222 and the corresponding lower contact 2232 are collectively defined as a membrane switch 221. Moreover, for maintaining the spacing distance between each upper contact 2222 and the corresponding lower contact 2232, the intermediate film layer 224 is arranged between the upper film layer 222 and the lower film layer 223. In addition, the intermediate film layer 224 comprises plural perforations 2241 corresponding to the plural upper contacts 2222 and the plural lower contacts 2232. Preferably but not exclusively, at least one of the upper film layer 222, the lower film layer 223 and the intermediate film layer 224 is made of polycarbonate (PC), polyethylene terephthalate (PET), polymethylmethacrylate (PMMA), polyurethane (PU) or polyimide (PI).

Each of the plural keys 20 and 20' comprises a keycap 201, a connecting element 202 and an elastic element 203. The connecting element 202 is connected between the keycap 201 and the base plate 21. Through the connecting element 202, the keycap 201 is movable upwardly or downwardly relative to the base plate 21. The elastic element 203 is arranged between the keycap 201 and the base plate 21. Moreover, the elastic element 203 comprises a contacting part 2031. In an embodiment, the keycap 201 comprises fixed hooks 2011 and movable hooks 2012. The fixed hooks 2011 and the movable hooks 2012 are disposed on a bottom surface of the keycap 201. In an embodiment, the connecting element 202 is a scissors-type connecting element. Moreover, the connecting element 202 comprises a first frame 2021 and a second frame 2022. The second frame 2022 is pivotally coupled to the first frame 2021. The first frame 2021 is an inner frame, and the second frame 2022 is an outer frame.

The base plate 21 comprises a plate body 212, plural first base plate hooks 213 and plural second base plate hooks 214. The plate body 212 is located under the membrane circuit board 22. The plural first base plate hooks 213 and the plural second base plate hooks 214 are protruded upwardly from the plate body 212 and penetrated through the membrane circuit board 22.

The first end 20211 of the first frame 2021 is connected with the corresponding fixed hook 2011 of the keycap 201. The second end 20212 of the first frame 2021 is connected with the second base plate hook 214 of the base plate 21. The first end 20221 of the second frame 2022 is connected with the corresponding first base plate hook 213 of the base plate 21. The second end 20222 of the second frame 2022 is connected with the movable hook 2012 of the keycap 201. Due to the above structure, the first frame 2021 and the second frame 2022 can be swung relative to each other. Consequently, the first frame 2021 and the second frame 2022 are switched from a stacked state to an open-scissors state or switched from the open-scissors state to the stacked state. The connecting relationships between the connecting element 202, the base plate 21 and the keycap 201 are presented herein for purpose of illustration and description only.

While the keycap 201 of any key 20 or 20' is depressed and moved downwardly relative to the base plate 21, the first frame 2021 and the second frame 2022 of the connecting element 202 are switched from the open-scissors state to the stacked state. Moreover, as the keycap 201 is moved downwardly to compress the elastic element 203, the corresponding upper contact 2222 is pushed and triggered by the contacting part 2031 of the elastic element 203. Consequently, the corresponding upper contact 2222 is contacted with the corresponding lower contact 2232 through the corresponding perforation 2241. In such way, the corresponding membrane switch 221 is electrically conducted, and the keyboard device 2 generates a corresponding key signal. When the keycap 201 of the key 20 or 20' is no longer depressed, the keycap 201 is moved upwardly relative to the base plate 21 in response to an elastic force of the elastic element 203. Meanwhile, the first frame 2021 and the second frame 2022 are switched from the stacked state to the open-scissors state. Consequently, the keycap 201 is returned to its original position.

Please refer to FIGS. 4, 5 and 6 again. The length L2 of the key 20' is much larger than the width W2 of the key 20'. The key 20' further comprises two stabilizer bars 204. Each stabilizer bar 204 is connected between the key 20' and the base plate 21. The keycap 201 of the key 20' further comprises plural stabilizer lock parts 2013. The stabilizer lock parts 2013 are disposed on a bottom surface of the keycap 201. The base plate 21 further comprises plural connecting structures 211. The plural connecting structures 211 are protruded upwardly from the plate body 212 and penetrated through the membrane circuit board 22. Each connecting structure 211 comprises an upper connecting part 2112 and plural lateral connecting parts 2113. The plural lateral connecting parts 2113 are connected with the upper connecting part 2112. Moreover, plural locking holes 2111 are formed between the connecting part 2112, the plural lateral connecting parts 2113 and the plate body 212. The end parts 2042 of the stabilizer bars 204 are penetrated through the corresponding locking holes 2111. In this embodiment, each stabilizer bar 204 further comprises a transverse bar part 2041. The transverse bar part 2041 is inserted into the corresponding stabilizer lock part 2013 of the keycap 201 and pivotally coupled to the keycap 201. The end part 2042 of each stabilizer bar 204 are hook parts, which are located at two ends of the transverse bar part 2041.

Figure 8:
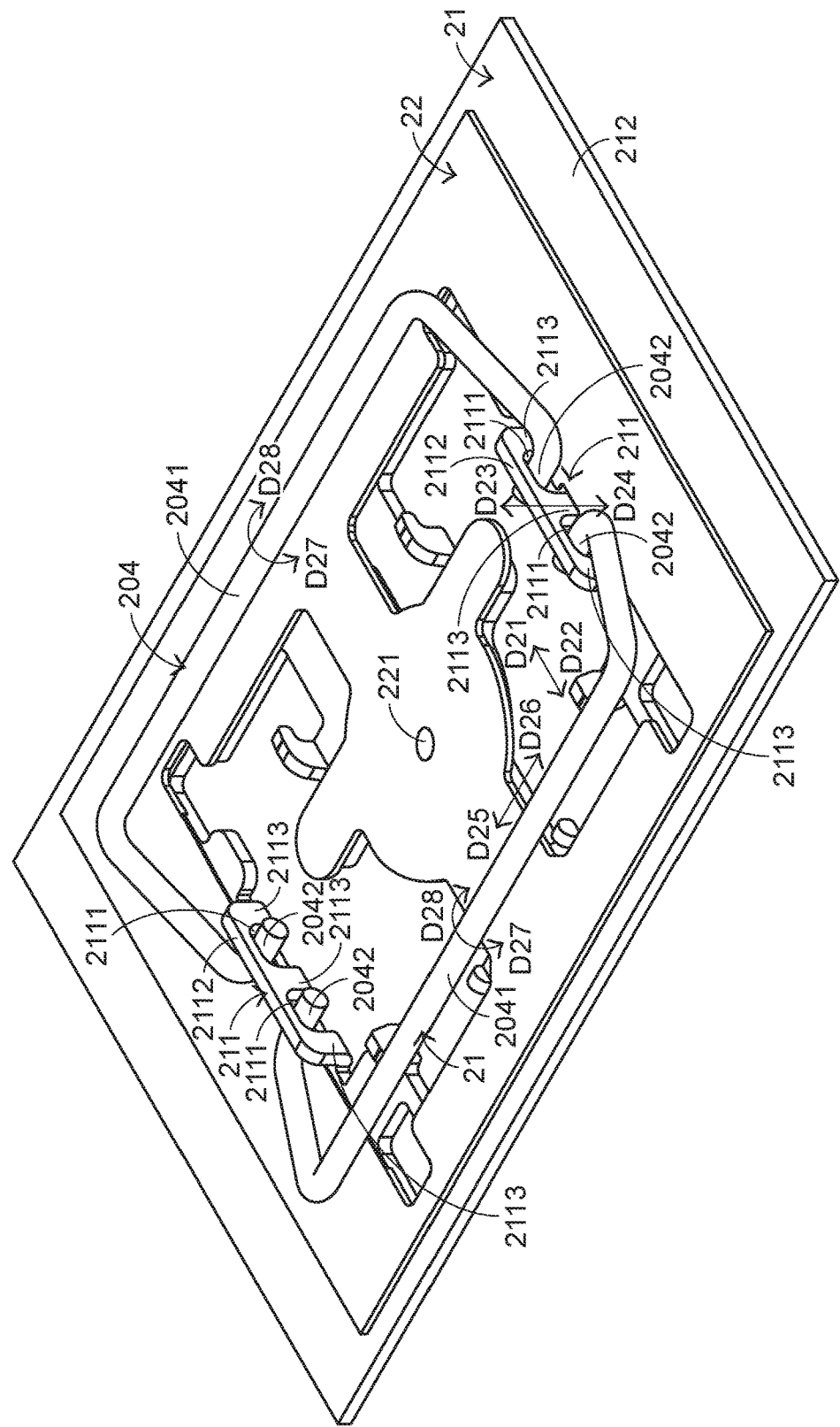
FIG. 8 schematically illustrates the actions of the stabilizer bar of the keyboard device as shown in FIG. 4.

FIG. 8 schematically illustrates the actions of the stabilizer bar of the keyboard device as shown in FIG. 4. For succinctness, only the stabilizer bars 204 and the related components are shown in FIG. 8. The keycap 201 and the connecting element 202 are not shown in FIG. 8. While the keycap 201 of the key 20' is moved upwardly or downwardly relative to the base plate 21, the stabilizer bars 204 are moved in the direction D21 or the direction D22, and/or moved in the direction D23 or the direction D24, and/or moved in the direction D25 or the direction D26, and/or rotated in the direction D27 or the direction D28. In addition, the transverse bar parts 2041 are rotated relative to the corresponding stabilizer lock parts 2013 of the keycap 201. Consequently, while the key 20' is moved upwardly or downwardly relative to the base plate 21, the key 20' is kept stable and not inclined. Moreover, this design is helpful to increase the strength of the keycap 201.

Figure 9:
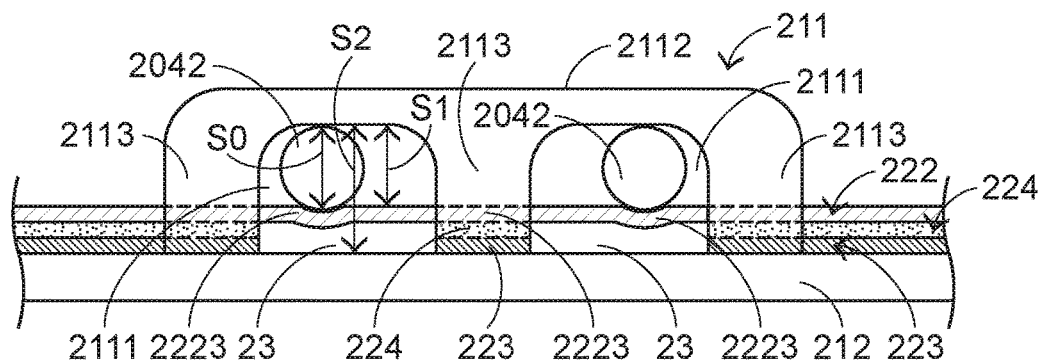
FIG. 9 is a schematic cross-sectional view illustrating portions of the stabilizer bar, the base plate and the membrane circuit board of the keyboard device as shown in FIG. 4 and taken along a viewpoint.
Figure 10:
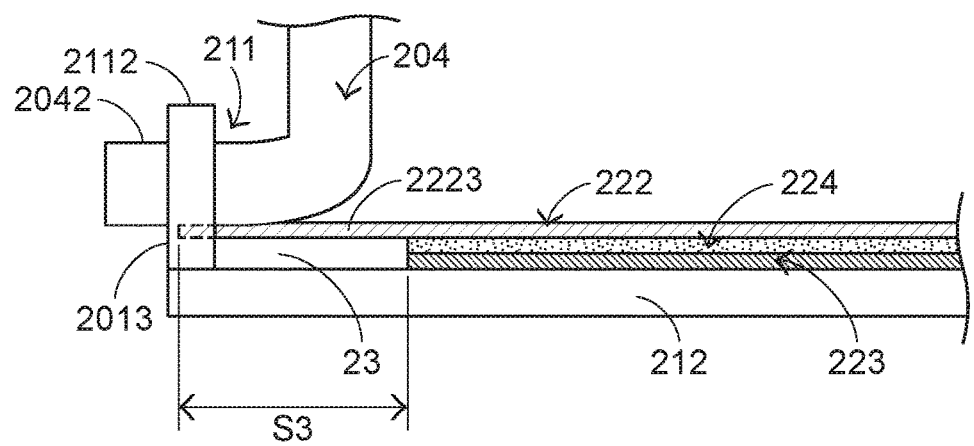
FIG. 10 is a schematic cross-sectional view illustrating portions of the stabilizer bar, the base plate and the membrane circuit board of the keyboard device as shown in FIG. 4 and taken along another viewpoint.

Please refer to FIGS. 7, 9 and 10. FIG. 9 is a schematic cross-sectional view illustrating portions of the stabilizer bar, the base plate and the membrane circuit board of the keyboard device as shown in FIG. 4 and taken along a viewpoint. FIG. 10 is a schematic cross-sectional view illustrating portions of the stabilizer bar, the base plate and the membrane circuit board of the keyboard device as shown in FIG. 4 and taken along another viewpoint. For clearly illustrating the structures of various layers, the sizes and thicknesses of the stabilizer bar, the base plate and the membrane circuit board as shown in FIGS. 9 and 10 are presented herein for purpose of illustration and description only.

The upper film layer 222 of the membrane circuit board 22 comprises an extension part 2223. The extension part 2223 is externally extended over a periphery of the intermediate film layer 224 and a periphery of the lower film layer 223. Consequently, a clearance space 23 is formed between the extension part 2223 and the underlying plate body 212. There is a first vertical distance S1 between the bottom surface of the upper connecting part 2112 of the connecting structure 211 and the extension part 2223. There is a second vertical distance S2 between the bottom surface of the upper connecting part 2112 of the connecting structure 211 and the plate body 212 of the base plate 21. When the end part 2042 of the stabilizer bar 204 is penetrated through the corresponding locking hole 2111 of the connecting structure 211, a portion of the end part 2042 is clamped between the upper connecting part 2112 of the connecting structure 211 and the extension part 2223 of the upper film layer 222. Preferably but not exclusively, the diameter S0 of the stabilizer bar 204 is larger than the first vertical distance S1.

As mentioned above, the structure of the keyboard device is specially designed. While the keycap 201 of the key 20' is moved upwardly or downwardly relative to the base plate 21, the end part 2042 of the stabilizer bar 204 is slid between the upper connecting part 2112 of the connecting structure 211 and the extension part 2223 of the upper film layer 222. Moreover, the end part 2042 of the stabilizer bar 204 and the extension part 2223 of the upper film layer 222 are interfered with each other. When the end part 2042 of the stabilizer bar 204 and the extension part 2223 of the upper film layer 222 are interfered with each other, the end part 2042 of the stabilizer bar 204 and the extension part 2223 of the upper film layer 222 are sunken downwardly into the clearance space 23.

In accordance with a feature of the present invention, the diameter S0 of the stabilizer bar 204 is larger than the first vertical distance S1. The end part 2042 of the stabilizer bar 204 is clamped between the upper connecting part 2112 of the connecting structure 211 and the extension part 2223 of the upper film layer 222. While the stabilizer bar 204 is moved, the end part 2042 of the stabilizer bar 204 and the extension part 2223 of the upper film layer 222 are interfered with each other. Consequently, the gap between the end part 2042 of the stabilizer bar 204 and the upper connecting part 2112 of the connecting structure 211 and the gaps between the end part 2042 of the stabilizer bar 204 and the lateral connecting parts 2113 of the connecting structure 211 are effectively reduced. While the stabilizer bar 204 is moved, the upper connecting part 2112 or the lateral connecting parts 2113 of the connecting structure 211 are not directly collided by the end part 2042 of the stabilizer bar 204. Consequently, the unpleasing sound is reduced.

As mentioned above, the plate body 212 of the base plate 21 is located under the clearance space 23. That is, the site of the base plate 21 corresponding to the clearance space 23 is not a through-hole. Consequently, the end part 2042 of the stabilizer bar 204 and the extension part 2223 of the upper film layer 222 can be sunken downwardly to a limited extent. Since the end part 2042 of the stabilizer bar 204 is not extremely sunken in the downward direction, the gap between the end part 2042 of the stabilizer bar 204 and the upper connecting part 2112 of the connecting structure 211 is not very large. Consequently, when the end part 2042 of the stabilizer bar 204 is moved upwardly to collide with the upper connecting part 2112 of the connecting structure 211 in response to an elastic force of the extension part 2223 of the upper film layer 222, the generated sound is not very loud.

Please refer to FIGS. 8 and 9 again. In this embodiment, the two clearance spaces 23 corresponding to the end parts 2042 of the two stabilizer bars 204 are separated from each other. Consequently, the extents of the interference between the end parts 2042 of the two stabilizer bars 204 and the extension part 2223 of the upper film layer 222 are substantially equal. In this embodiment, a portion of the lower film layer 223 and a portion of the intermediate film layer 224 are arranged between the two clearance spaces 23 corresponding to the end parts 2042 of the two stabilizer bars 204. Moreover, the lower film layer 223 and the intermediate film layer 224 between the two clearance spaces 23 also have the function of supporting the extension part 2223. Consequently, when the end part 2042 of the stabilizer bar 204 and the extension part 2223 are interfered with each other, the deformable extent of the extension part 2223 is reduced. Under this circumstance, the sunken extents of the end part 2042 of the stabilizer bar 204 toward the clearance spaces 23 are effectively controlled, and the gaps between the end parts 2042 of the stabilizer bar 204 and the upper connecting parts 2112 of the connecting structure 211 are effectively controlled.

Please refer to FIG. 10. As mentioned above, the site of the base plate 21 corresponding to the clearance space 23 is not a through-hole. In other words, the sunken end parts 2042 of the stabilizer bar 204 can be supported by the plate body 212 of the base plate 21. Consequently, the operating stability of the stabilizer bar 204 is not adversely affected. Moreover, the extensible range S3 of the extension part 2223 of the upper film layer 222 is determined according to the movable range of the end part 2042 of the stabilizer bar 204 in the direction D21, the direction D22, the direction D25 and the direction D26. Consequently, even if the site of the base plate 21 corresponding to the clearance space 23 is not a through-hole, the end part 2042 of the stabilizer bar 204 and the plate body 212 of the base plate 21 do not collide with each other to generate the sound.

Figure 11:
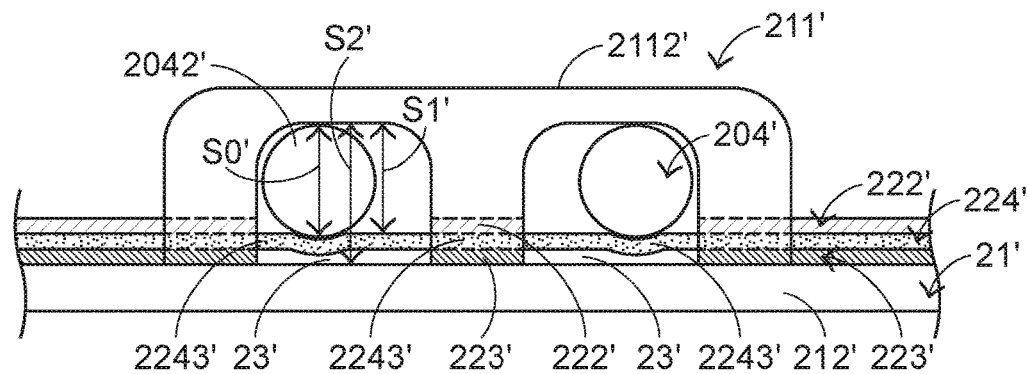
FIG. 11 is a schematic cross-sectional view illustrating portions of a stabilizer bar, a base plate and a membrane circuit board of a keyboard device according to a second embodiment of the present invention and taken along a viewpoint.
Figure 12:
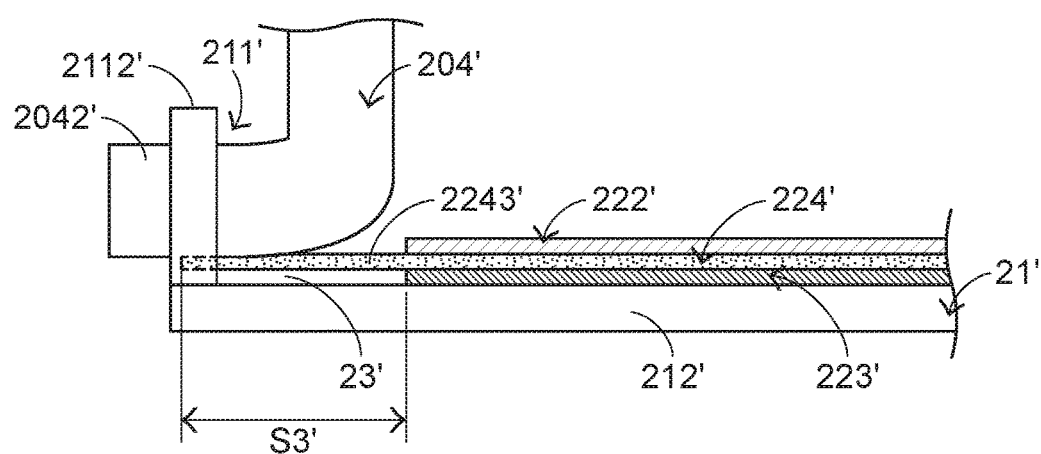
FIG. 12 is a schematic cross-sectional view illustrating portions of the stabilizer bar, the base plate and the membrane circuit board of the keyboard device of FIG. 11 and taken along another viewpoint.

Please refer to FIGS. 11 and 12. FIG. 11 is a schematic cross-sectional view illustrating portions of a stabilizer bar, a base plate and a membrane circuit board of a keyboard device according to a second embodiment of the present invention and taken along a viewpoint. FIG. 12 is a schematic cross-sectional view illustrating portions of the stabilizer bar, the base plate and the membrane circuit board of the keyboard device of FIG. 11 and taken along another viewpoint. For clearly illustrating the structures of various layers, the sizes and thicknesses of the stabilizer bar, the base plate and the membrane circuit board as shown in FIGS. 11 and 12 are presented herein for purpose of illustration and description only.

The structures and functions of the components of the keyboard device which are identical to those of the first embodiment are not redundantly described herein. In comparison with the first embodiment, the diameter S0' of the stabilizer bar 204' is distinguished, and the second vertical distance S2' between the bottom surface of the upper connecting part 2112' of the connecting structure 211' and the plate body 212' of the base plate is distinguished. In this embodiment, the end part 2042' of the stabilizer bar 204' is clamped between the upper connecting part 2112' and the intermediate film layer 224' of the membrane circuit board 22'. Especially, the intermediate film layer 224' comprises an extension part 2243'. The extension part 2243' is externally extended over a periphery of the upper film layer 222' and a periphery of the lower film layer 223'. Consequently, a clearance space 23' is formed between the extension part 2243' and the underlying plate body 212'. When the end part 2042' of the stabilizer bar 204' is penetrated through the corresponding locking hole 2111' of the connecting structure 211', a portion of the end part 2042' is clamped between the upper connecting part 2112' of the connecting structure 211' and the extension part 2243' of the intermediate film layer 224'. Preferably, the diameter S0' of the stabilizer bar 204' is larger than the first vertical distance SF between the bottom surface of the upper connecting part 2112' of the connecting structure 211' and the extension part 2243' of the intermediate film layer 224'.

As mentioned above, the structure of the keyboard device is specially designed. While the keycap (not shown) of the key (not shown) is moved upwardly or downwardly relative to the base plate 21', the end part 2042' of the stabilizer bar 204' is slid between the upper connecting part 2112' of the connecting structure 211' and the extension part 2243' of the intermediate film layer 224'. Moreover, the end part 2042' of the stabilizer bar 204' and the extension part 2243' of the intermediate film layer 224' are interfered with each other. When the end part 2042' of the stabilizer bar 204' and the extension part 2243' of the intermediate film layer 224' are interfered with each other, the end part 2042' of the stabilizer bar 204' and the extension part 2243' of the intermediate film layer 224' are sunken downwardly into the clearance space 23'.

In accordance with a feature of the present invention, the diameter S0' of the stabilizer bar 204' is larger than the first vertical distance SF. The end part 2042' of the stabilizer bar 204' is clamped between the upper connecting part 2112' of the connecting structure 211' and the extension part 2243' of the intermediate film layer 224'. While the stabilizer bar 204' is moved, the end part 2042' of the stabilizer bar 204' and the extension part 2243' of the intermediate film layer 224' are interfered with each other. Consequently, the gap between the end part 2042' of the stabilizer bar 204' and the upper connecting part 2112' of the connecting structure 211' and the gaps between the end part 2042' of the stabilizer bar 204' and the lateral connecting parts 2113' of the connecting structure 211' are effectively reduced. While the stabilizer bar 204' is moved, the upper connecting part 2112' or the lateral connecting parts 2113' of the connecting structure 211' are not directly collided by the end part 2042' of the stabilizer bar 204'. Consequently, the intensity of the unpleasing sound is reduced.

As mentioned above, the plate body 212' of the base plate 21' is located under the clearance space 23'. That is, the site of the base plate 21' corresponding to the clearance space 23' is not a through-hole. Consequently, the end part 2042' of the stabilizer bar 204' and the extension part 2243' of the intermediate film layer 224' can be sunken downwardly to a limited extent. Since the end part 2042' of the stabilizer bar 204' is not extremely sunken in the downward direction, the gap between the end part 2042' of the stabilizer bar 204' and the upper connecting part 2112' of the connecting structure 211' is not very large. Consequently, when the end part 2042' of the stabilizer bar 204' is moved upwardly to collide with the upper connecting part 2112' of the connecting structure 211' in response to an elastic force of the extension part 2243' of the intermediate film layer 224', the generated sound is not very loud.

As mentioned above, the site of the base plate 21' corresponding to the clearance space 23' is not a through-hole. In other words, the sunken end parts 2042' of the stabilizer bar 204' can be supported by the plate body 212' of the base plate 21'. Consequently, the operating stability of the stabilizer bar 204' is not adversely affected. Moreover, the extensible range S3' of the extension part 2243' of the intermediate film layer 224' is determined according to the movable range of the end part 2042' of the stabilizer bar 204'. Consequently, even if the site of the base plate 21' corresponding to the clearance space 23' is not a through-hole, the end part 2042' of the stabilizer bar 204' and the plate body 212' of the base plate 21' do not collide with each other to generate the sound.

Figure 13:
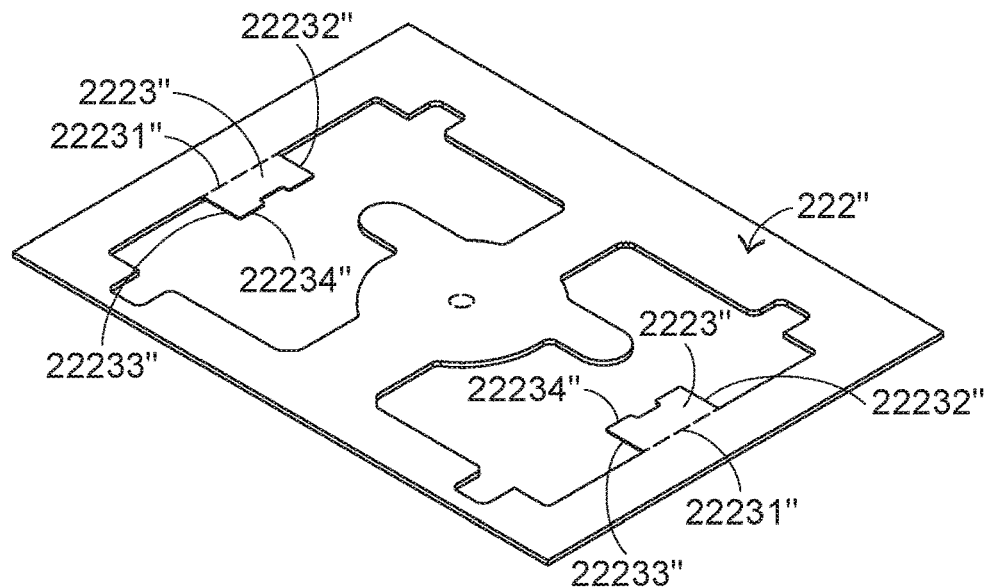
FIG. 13 is a schematic perspective view illustrating a membrane circuit board of a keyboard device according to a third embodiment of the present invention and taken along a viewpoint and taken along a viewpoint.
Figure 14:
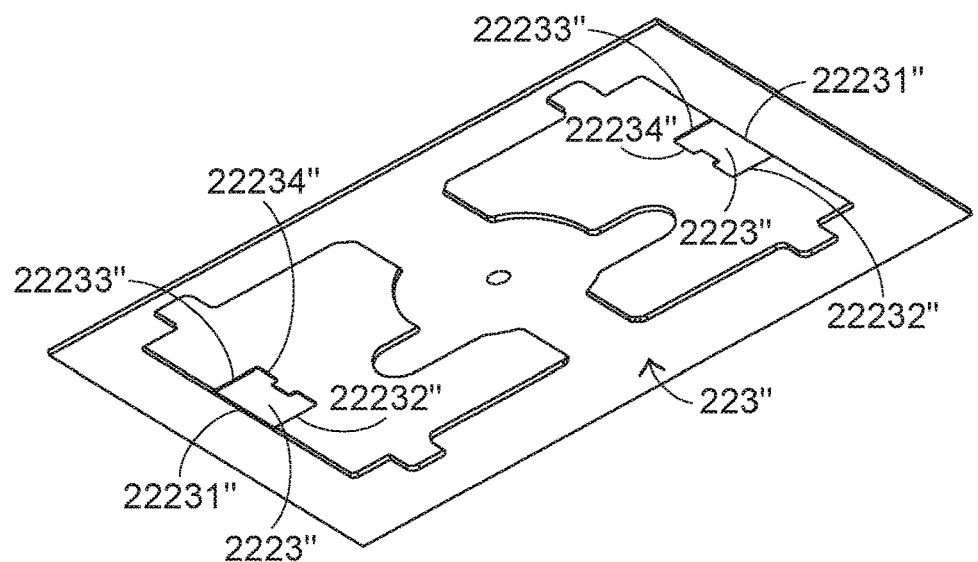
FIG. 14 is a schematic perspective view illustrating the membrane circuit board of FIG. 13 and taken along a viewpoint and taken along another viewpoint.
Figure 15:
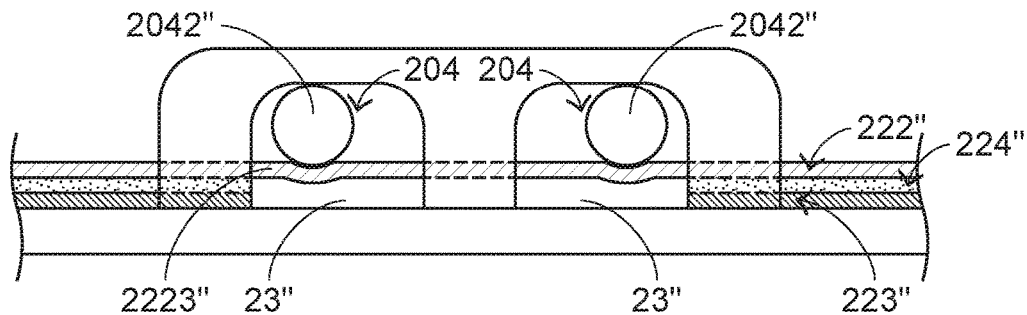
FIG. 15 is a schematic cross-sectional view illustrating portions of a stabilizer bar, a base plate and the membrane circuit board of the keyboard device according to the third embodiment of the present invention.

Please refer to FIGS. 13, 14 and 15. FIG. 13 is a schematic perspective view illustrating a membrane circuit board of a keyboard device according to a third embodiment of the present invention and taken along a viewpoint and taken along a viewpoint. FIG. 14 is a schematic perspective view illustrating the membrane circuit board of FIG. 13 and taken along a viewpoint and taken along another viewpoint. FIG. 15 is a schematic cross-sectional view illustrating portions of a stabilizer bar, a base plate and the membrane circuit board of the keyboard device according to the third embodiment of the present invention. The structures and functions of the components of the keyboard device which are identical to those of the first embodiment are not redundantly described herein.

In the first embodiment as shown in FIGS. 6 and 7, the edges 22231, 22232 and 22233 of the extension part 2223 are fixed edges, and the edge 22234 of the extension part 2223 is a floated edge. In the upper film layer 222" of this embodiment, the edge 22231" of the extension part 2223" is a fixed edge, and the edges 22232", 22233" and 22234" of the extension part 2223" are floated edges. In comparison with the first embodiment, the two clearance spaces 23" corresponding to the end parts 2042" of the two stabilizer bars 204" are not separated from each other by the lower film layer 223" and the intermediate film layer 224". That is, the two clearance spaces 23" corresponding to the end parts 2042" of the two stabilizer bars 204" are collaboratively defined as the same clearance space.

Figure 16:
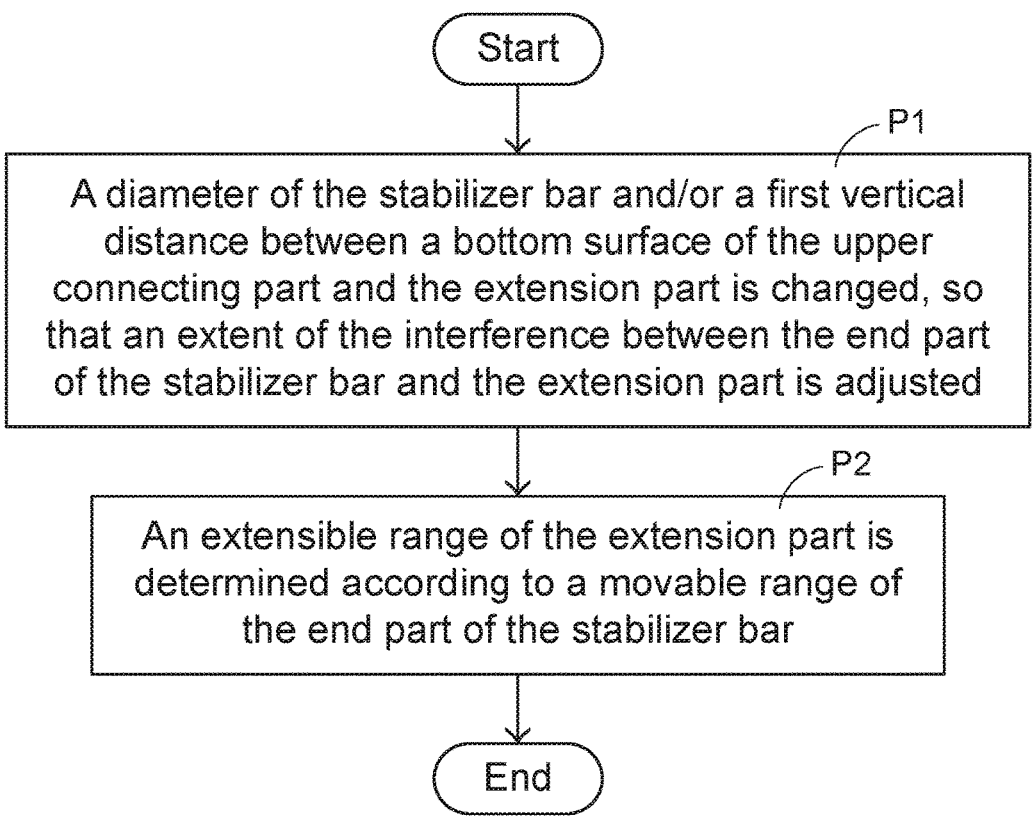
FIG. 16 is a flowchart illustrating a manufacturing method for manufacturing a keyboard device according to an embodiment of the present invention.

The present invention further comprises a manufacturing method for manufacturing the keyboard device of the present invention. FIG. 16 is a flowchart illustrating a manufacturing method for manufacturing a keyboard device according to an embodiment of the present invention. The manufacturing method comprises steps P1 and P2.

In the step P1, a diameter of the stabilizer bar and/or a first vertical distance between a bottom surface of the upper connecting part and the extension part is changed, so that an extent of the interference between the end part of the stabilizer bar and the extension part is adjusted. The tactile feel of depressing the key and the sound-reducing efficacy after depressing the key will be enhanced.

In the step P1, the end part of the stabilizer bar is clamped between the upper connecting part and the extension part of the first film layer, and the first film layer is selected from at least one of the upper film layer and the intermediate film layer of the membrane circuit board according to the diameter of the stabilizer bar and a second vertical distance between the upper connecting part and the plate body, wherein the first vertical distance between the upper connecting part and the extension part is smaller than the diameter of the stabilizer bar.

In the step P2, an extensible range of the extension part is determined according to a movable range of the end part of the stabilizer bar. That is, portions of the film layers that are not selected in the step P1 are removed. Consequently, the clearance spaces are formed between the extension part and the underlying plate body. Consequently, the end part of the stabilizer bar and the film layer selected in the step P1 are interfered with each other to achieve the clearance efficacy.

In the example of FIG. 9, the selected film layer in the step P1 is the upper film layer 222. In addition, a portion of the end part 2042 of the stabilizer bar 204 is clamped between the upper connecting part 2112 and the upper film layer 222. The portions of the lower film layer 223 and the intermediate film layer 224 corresponding to the extension part 2223 of the upper film layer 222 are removed. Consequently, the region between the extension part 2223 of the upper film layer 222 and the underlying plate body 212 of the base plate 21 is hollow and defined as the clearance space 23.

In the example of FIG. 11, the selected film layer in the step P1 is the intermediate film layer 224'. In addition, a portion of the end part 2042' of the stabilizer bar 204' is clamped between the upper connecting part 2112' and the intermediate film layer 224'. The portions of the upper film layer 222' and the lower film layer 223' corresponding to the extension part 2243' of the intermediate film layer 224' are removed. Consequently, the end part 2042' of the stabilizer bar 204' can be placed on the extension part 2243' of the intermediate film layer 224', and the region between the extension part 2243' of the intermediate film layer 224' and the underlying plate body 212' of the base plate 21 is hollow and defined as the clearance space 23'.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A keyboard device, comprising:
a membrane circuit board comprising a membrane switch, a first film layer and a second film layer, wherein the first film layer and the second film layer are stacked on each other, the first film layer comprises an extension part, and the extension part is extended over a periphery of the second film layer;
a base plate comprising a plate body and a connecting structure, wherein the plate body is located under the membrane circuit board, and the connecting structure is protruded upwardly from the plate body and penetrated through the membrane circuit board, wherein the connecting structure comprises an upper connecting part and a lateral connecting part, the lateral connecting part is connected with the upper connecting part, and a locking hole is formed between the connecting part, the lateral connecting part and the plate body, wherein the plate body is located under the extension part, and a clearance space is formed between the extension part and the plate body; and
a key comprising a keycap and a stabilizer bar, wherein while the keycap is moved downwardly relative to the membrane circuit board, the membrane switch is triggered, wherein the stabilizer bar is connected between the keycap and the base plate, an end part of the stabilizer bar is penetrated through the locking hole and clamped between the upper connecting part and the extension part, wherein while the keycap is moved upwardly or downwardly relative to the base plate, the end part of the stabilizer bar is slid between the upper connecting part and the extension part, the end part of the stabilizer bar and the extension part are interfered with each other, and the end part of the stabilizer bar and the extension part are sunken downwardly into the clearance space.

2. The keyboard device according to claim 1, wherein there is a first vertical distance between a bottom surface of the upper connecting part and the extension part, and the first vertical distance is smaller than a diameter of the stabilizer bar.

3. The keyboard device according to claim 1, wherein the stabilizer bar further comprises a transverse bar part, and the transverse bar part is pivotally coupled to the keycap, wherein the end part of the stabilizer bar is a hook part, which is located at an end of the transverse bar part.

4. The keyboard device according to claim 3, wherein the keycap comprises a stabilizer lock part, and the transverse bar part is inserted into the stabilizer lock part and pivotally coupled to the keycap, wherein while the keycap is moved upwardly or downwardly relative to the base plate, the transverse bar part is rotated relative to the stabilizer lock part.

5. The keyboard device according to claim 1, wherein the first film layer is an upper film layer, and the second film layer is a lower film layer, wherein a first circuit pattern is formed on the upper film layer, a second circuit pattern is formed on the lower film layer, the first circuit pattern comprises an upper contact, and the second circuit pattern comprises a lower contact, wherein the upper contact and the lower contact are separated from each other by a spacing distance and collectively defined as the membrane switch.

6. The keyboard device according to claim 5, wherein the membrane circuit board further comprises an intermediate film layer between the upper film layer and the lower film layer, so that the upper contact and the lower contact are separated from each other by the spacing distance, wherein the intermediate film layer comprises a perforation corresponding to the upper contact and the lower contact.

7. The keyboard device according to claim 1, wherein the membrane circuit board further comprises an upper film layer, the first film layer is an intermediate film layer, and the second film layer is a lower film layer, wherein a first circuit pattern is formed on the upper film layer, a second circuit pattern is formed on the lower film layer, the first circuit pattern comprises an upper contact, and the second circuit pattern comprises a lower contact, wherein the upper contact and the lower contact are separated from each other by a spacing distance and collectively defined as the membrane switch.

8. The keyboard device according to claim 1, wherein at least one of the first film layer and the second film layer is made of polycarbonate (PC), polyethylene terephthalate (PET), polymethylmethacrylate (PMMA), polyurethane (PU) or polyimide (PI).

9. The keyboard device according to claim 1, wherein the key further comprises a connecting element, wherein the connecting element is connected between the base plate and the keycap, and the keycap is movable upwardly or downwardly relative to the base plate through the connecting element.

10. The keyboard device according to claim 9, wherein the connecting element comprises:
a first frame, wherein a first end of the first frame is connected with the keycap, and a second end of the first frame is connected with the base plate; and
a second frame connected with the first frame and swung relative to the first frame, wherein a first end of the second frame is connected with the base plate, and a second end of the second frame is connected with the keycap.

11. The keyboard device according to claim 10, wherein the keycap further comprises a fixed hook and a movable hook, wherein the fixed hook is connected with the first end of the first frame, and the movable hook is connected with the second end of the second frame, so that the second end of the second frame is movable within the movable hook.

12. The keyboard device according to claim 10, wherein the base plate further comprises a first base plate hook and a second base plate hook, which are protruded upwardly from the base plate, wherein the first base plate hook is connected with the first end of the second frame, and the second base plate hook is connected with the second end of the first frame.

13. The keyboard device according to claim 1, wherein the key further comprises an elastic element, wherein the elastic element is arranged between the keycap and the membrane circuit board, and the elastic element comprises a contacting part, wherein while the keycap is depressed, the elastic element is compressed by the keycap and the membrane switch is pushed by the contacting part, wherein when the keycap is not depressed, the keycap is returned to an original position in response to an elastic force provided by the elastic element.

14. A manufacturing method for manufacturing the keyboard device according to claim 1, comprising:
(P1) changing a diameter of the stabilizer bar and/or a first vertical distance between a bottom surface of the upper connecting part and the extension part, so that an extent of an interference between the end part of the stabilizer bar and the extension part is adjusted; and
(P2) determining an extensible range of the extension part according to a movable range of the end part of the stabilizer bar.

15. The manufacturing method according to claim 14, wherein in the step (P1), the end part of the stabilizer bar is clamped between the upper connecting part and the extension part of the first film layer, and the first film layer is selected from the membrane circuit board according to the diameter of the stabilizer bar and a second vertical distance between the upper connecting part and the plate body, wherein the first vertical distance between the upper connecting part and the extension part is smaller than the diameter of the stabilizer bar.

* * * * *